United States Patent [19]

Takeda

[11] Patent Number: 4,823,459

[45] Date of Patent: Apr. 25, 1989

[54] AUTOMATIC FINISHING SYSTEM FOR WOUND COIL IN COIL WINDING MACHINE

[75] Inventor: Shuji Takeda, Tokyo, Japan

[73] Assignee: Tanaka Seiko Co., Ltd., Tokyo, Japan

[21] Appl. No.: 101,861

[22] Filed: Sep. 25, 1987

[30] Foreign Application Priority Data

Sep. 30, 1986 [JP] Japan ................................ 61-232631

[51] Int. Cl.[4] ........................ B23Q 7/00; B65G 25/00

[52] U.S. Cl. ........................................ 29/563; 29/564; 29/33 P; 198/403; 198/465.2; 198/468.2; 198/580; 414/225; 414/751

[58] Field of Search ...................... 29/33 F, 33 J, 563, 29/564, 33 P; 198/339.1, 403, 465.2, 468.2, 580; 414/225, 751

[56] References Cited

U.S. PATENT DOCUMENTS

| | | | |
|---|---|---|---|
| 2,861,672 | 11/1958 | Buhrer et al. | 198/580 |
| 3,478,859 | 11/1969 | Krempel et al. | 198/465.2 |
| 3,938,748 | 2/1976 | Carmardella . | |
| 4,252,230 | 2/1981 | Eriksson | 198/740 |

FOREIGN PATENT DOCUMENTS

| | | |
|---|---|---|
| 1435964 | 5/1976 | United Kingdom . |

*Primary Examiner*—Gil Weidenfeld
*Assistant Examiner*—Daniel W. Howell
*Attorney, Agent, or Firm*—Spencer & Frank

[57] ABSTRACT

An automatic finishing system for a wound coil in a coil winding machine has a conveyor device for moving coil bobbins intermittently along a circulating endless path. Several finishing machines for carrying out different finishing steps are disposed within a limited space around the endless path. The conveyor device and the finishing machines are synchronously controlled by an electronic controller means. Each of the coil bobbins is held by a jig which is mounted on a movable jig-holder. A plurality of movable jig-holders are moved along one of two parallel guide rails and transferred to the other guide rail at each end of the guide rails to move along a substantially rectangular endless path.

3 Claims, 6 Drawing Sheets

AUTOMATIC FINISHING SYSTEM FOR WOUND COIL IN COIL WINDING MACHINE

BACKGROUND OF THE INVENTION

This invention relates to an automatic finishing system for wound coils in a coil winding machine which can automatically carry out several finishing steps in the manufacture of wound coils, the steps including taping, terminal soldering, continuity tests and the detection of defects in the products.

Such finishing steps for wound coils have been carried out by using several apparatuses for different steps which are arranged in a straight line. When a wound coil bobbin is transferred by conveyor means such as a belt conveyor to the position of the first apparatus which carries out the first finishing step, it is usual that the wound coil bobbin is put on this first apparatus by an operator or a robot. And after the first step by the first apparatus is completed, the bobbin is removed from the first apparatus and transferred and supplied to the next apparatus which carries out the next finishing step.

In such a conventional finishing process for wound coils, it is usual that the bobbin supply to and bobbin discharge from the respective apparatuses are carried out by operators or robots.

A finishing process for wound coils has been recently automated in a manner similar to that of a coil winding process itself. In some cases, the bobbin supply and discharge are carried out automatically by respective robots throughout the finishing process. These apparatuses used for the finishing process include for example, an automatic taping machine, an automatic soldering machine, an automatic selector and the like and these are only disposed or lined up in a straight line along the bobbin conveyor means such as a belt conveyor. Accordingly, the finishing process line becomes too long and requires a wide space for placing the apparatuses.

In such a lined up finishing process line, a long bobbin conveyor means must be provided because the discharge position for the final finishing step is far away from the bobbin supply position for the first finishing step.

There is a further problem. Some stations, e.g., the soldering step station, are preferably to be apart from the operators. But the straight-line type finishing apparatuses can not solve this problem.

It is an object of the present invention to provide an automatic finishing system for wound coils in a coil winding machine which can solve the above-mentioned problems, in which all the finishing steps may be carried out while the wound coil is always mounted on a jig which is movable intermittently along an endless path; the finishing apparatuses for the respective finishing steps may be disposed or lined up within a limited space around a group of travelling coil bobbins; the required space for disposing of the finishing apparatuses may be made much smaller than in the conventional long finishing process line; a layout of the finishing apparatuses may be easily designed; the product quality of finishing may be improved; and the working time may be shortened.

SUMMARY OF THE INVENTION

An automatic finishing system for a wound coil in a coil winding machine according to the present invention comprises: means for moving wound coil bobbins intermittently along a circulating endless path; finishing apparatuses for respective finishing steps disposed in order around the endless path; and an electronic controller for synchronously controlling at least the moving means for coil bobbins and the respective finishing apparatuses. When a coil bobbin reaches a predetermined position, necessary operations may be carried out. The automatic finishing system performs continuously and automatically a series of the finishing operations.

The wound coil moving means for moving the wound coil according to the present invention includes the following. Movable jig-holders for holding finishing jigs are arranged on two facing guide rails, a plurality of the movable jig-holders being on each of the guide rails. The movable jig-holders are moved intermittently on the guide rails. When the movable jig-holder reaches the ends of the guide rails, it is transferred onto the other guide rail by one of two swing arms to permit the movable jig-holder to circulate along a substantially rectangular endless path. Several finishing apparatuses are disposed around the substantially rectangular endless path. When the coil bobbin supported by the movable jig-holder through a finishing jig reaches the front of each of the finishing apparatuses, the predetermined operation is carried out. All of the foregoing steps are controlled by an electronic controller.

DESCRIPTION OF THE PREFERRED EMBODIMENTS

The invention of this application is explained in further detail with reference to the drawings.

Figure 1:
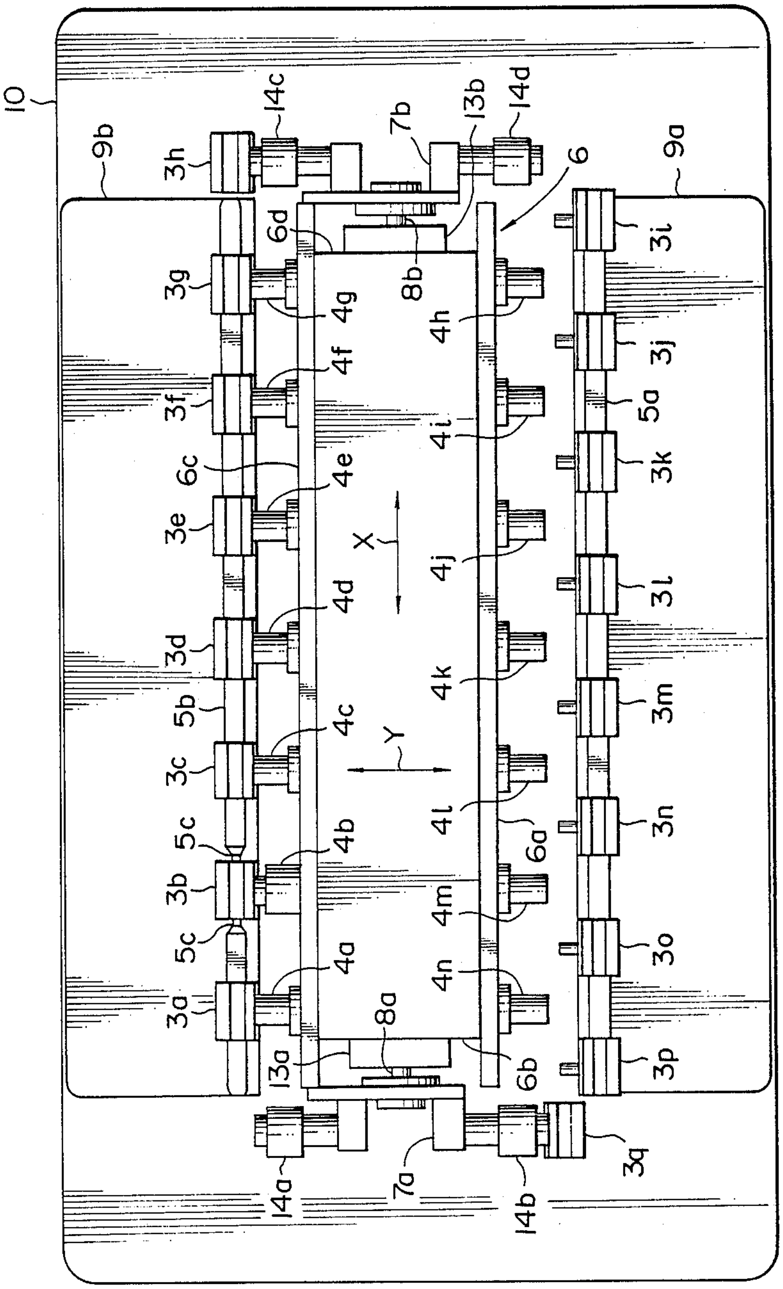
FIG. 1 is a plan view showing an essential portion of one embodiment of the automatic finishing system for a wound coil in a coil winding machine according to the present invention.
Figure 2:
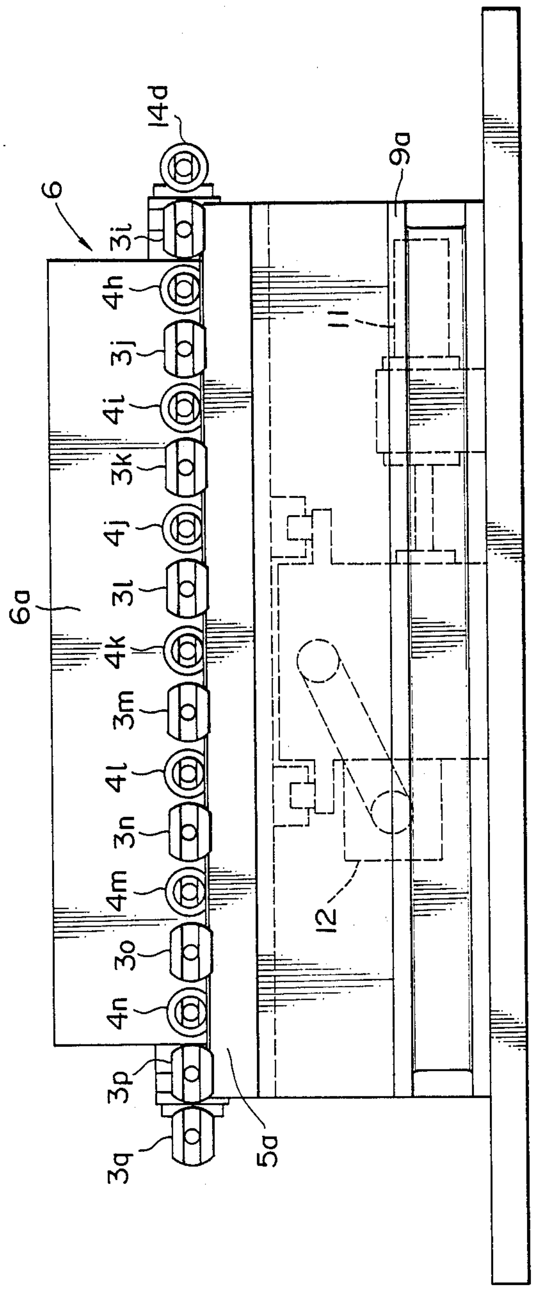
FIG. 2 is a front view of the essential portion of the embodiment shown in FIG. 1.
Figure 3:
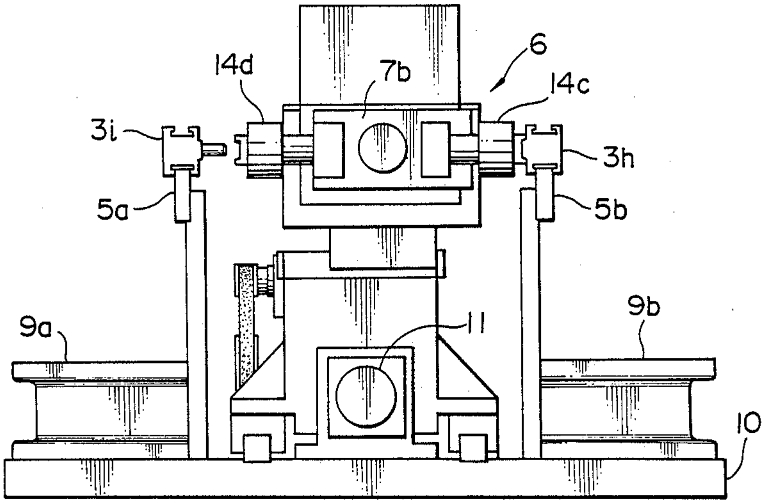
FIG. 3 is a right-hand side view of the essential portion of the embodiment shown in FIG. 1.

In FIGS. 1 to 3, finishing apparatuses for carrying out the respective finishing steps and finishing jigs are not shown for easy understanding of the essential portion of the system. The system shown in FIGS. 1 to 3 includes a base 10. Substantially on the center of the base 10 is disposed an X-Y movable bed 6. The X-Y movable bed 6 has, on its upper portion, two opposite sides 6*a* and 6*c*, and the side 6*a* is provided with chuck units 4*h*, 4*i*, 4*j*, 4*k*, 4*l*, 4*m* and 4*n* and likewise the side 6*c* is provided with chuck units 4*a*, 4*b*, 4*c*, 4*d*, 4*e*, 4*f* and 4*g*. The X-Y movable bed 6 also has, on its upper portion, two other opposite sides 6*b* and 6*d* which are provided with swing arms 7*a* and 7*b*, respectively. The swing arm 7*a* has two ends provided with chuck units 14*a* and 14*b*, and likewise the swing arm 7*b* has two ends provided with chuck units 14*c* and 14*d*. The swing arms 7*a* and 7*b* can swing around shafts 8*a* and 8*b* through an angle of 180 degrees.

Guide rails 5*a* and 5*b* are disposed facing and in parallel with the sides 6*a* and 6*b* of the X-Y movable bed 6, which are as mentioned above provided with the chuck units 4*a*, 4*b*, 4*c* . . . 4*n*. The guide rails 5*a* and 5*b* are fixed to the top of the machine-mounting beds 9*a* and 9*b*.

The upper portion of the X-Y movable bed 6 can move with respect to the base 10 in the right and left directions as indicated by an arrow X in FIG. 1 and in the back and forth directions as indicated by an arrow Y in FIG. 1. Accordingly, the chuck units 4*a*, 4*b*, 4*c* . . . 4*n*, 14*a*, 14*b*, 14*c* and 14*d* can change their relative postions by moving toward and away from the guide rails 5*a* and 5*b* and in parallel therewith. The right and left movement, the X-movement, is carried out by a motor 11 shown in FIG. 2 and the back and forth movement, the Y-movement, is carried out by a motor 12. The swing movement of the swing arms 7*a* and 7*b* is carried out by rotary actuators 13*a* and 13*b*, respectively.

Movable jig-holders 3*a*, 3*b*, 3*c* . . . 3*q*, which are moved by the chuck units 4*a* through 4*n* and 14*a* through 14*d*, *are disposed on the guide rails* 5*a* and 5*b* with equal distances between each other or coupled to one of the chuck units 14*a* and 14*b* of the swing arm 7*a*, or coupled to one of the chuck units 14*c* and 14*d* of the swing arm 7*b*. These movable jig-holders 3*a*, 3*b*, 3*c* . . . 3*q* can be fitted with and locked in the chuck units and can be unlocked and removed from the chuck units. When coupled to the chuck unit, the movable jig-holder is moved intermittently on the guide rail 5*a* or 5*b* by means of the movement of the upper portion of the X-Y movable bed 6 and transferred from on guide rail to the other guide rail by means of the chuck unit coupled to the end of the swing arm 7*a* or 7*b*.

Figure 4:
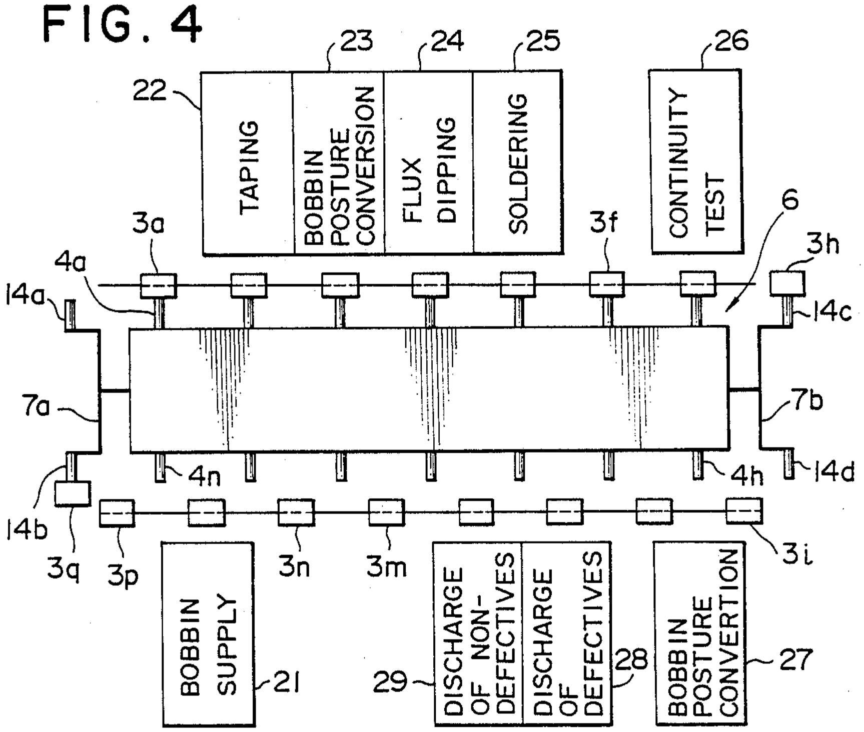
FIG. 4 is a schematic plan view showing one example of a layout of the finishing apparatuses for the finishing steps on a machine-mounting bed.

FIG. 4 is a schematic plan view showing one example of a layout of the finishing appartuses for the finishing steps on a machine-mounting bed. Referring to FIG. 4, finishing appartuses include in this example a bobbin supplying machine 21, a taping machine 22, a bobbin posture converter 23 which changes the direction of a coil axis, flux dipping equipment 24, a soldering machine 25, a continuity tester 26, a bobbin posture converter 27 which changes the direction of a coil axis, a discharge mechanism 28 for discharging defective coils and a discharge mechanism 29 for discharging non-defective coils disposed in the described order in the clockwise direction of the figure around the X-Y movable bed 6. A bobbin on which winding of a coil is completed is mounted on the finishing jig which is coupled to the movable jig-holder. When the movable jig-holder reaches the front of each of the finishing apparatuses the bobbin coupled to that jig-holder is adapted to be automatically treated with the associated finishing operation.

It is noted that, in FIG. 4, the upper portion of the X-Y movable bed 6, the swing arms 7*a* and 7*b*, the chuck units and the jig-holders are shown all in the simplified form and furthermore the finishing jigs and coil bobbins are omitted for easy understanding of these shown elements.

Figure 5:
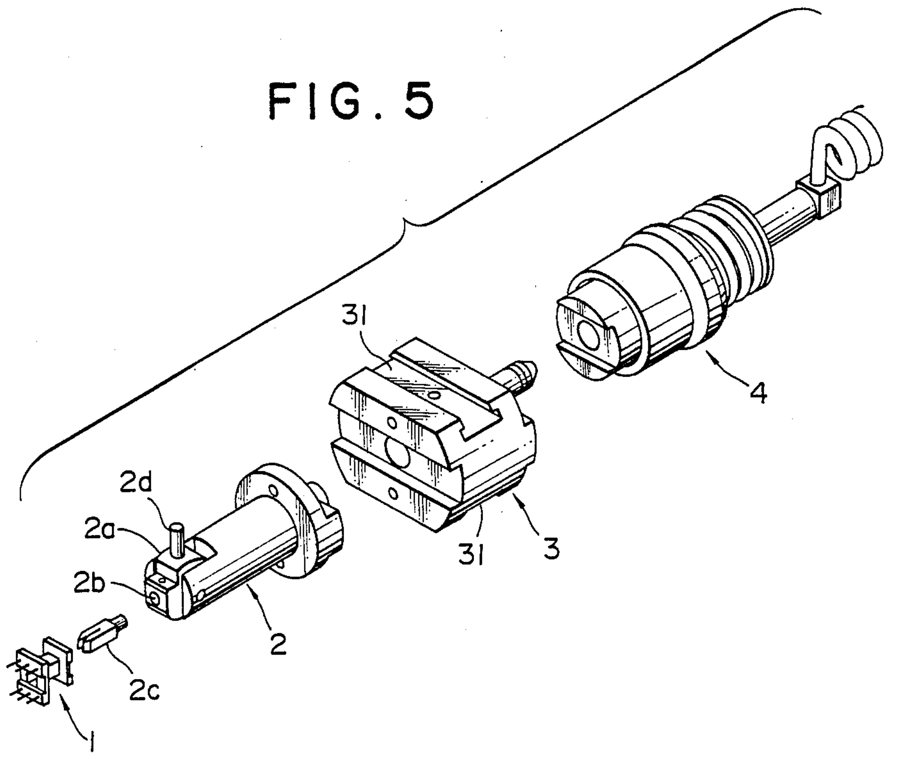
FIG. 5 is a perspective view showing, in an exploded form, a coil bobbin supporting mechanism.

FIG. 5 is an exploded perspective view showing the examples of a finishing jig 2, a movable jig-holder 3 and a chuck unit 4 together with a wound coil bobbin 1 used in this embodiment. The movable jig-holder 3 is coupled to the chuck unit 4 by means of "fitting" and being locked thereto by means of a locking function of the chuck unit 4. The movable jig-holder 3 is provided in its upper and lower surfaces with grooves 31, 31 which can engage with the guide rails 5*a* and 5*b*, respectively. The mova ble jig-holder 3 is coupled to the finishing jig 2 by means of "fitting" and is also screwed thereto. The finishing jig 2 is provided with a head 2*a* which is pivotally movable at 90 degrees. The head 2*a* is provided with a hole 2*b* into which a bobbin insert pin 2*c* is fitted and a projection 2*d* permitting the head 2*a* to swing. The wound coil bobbin 1 is fitted over the bobbin insert pin 2*c*, which is fitted into the hole 2*b* of the head 2*a* and screwed, and held in place.

Referring now to FIG. 6 which is an explanatory view for explaining the sequential different states of the movable jig-holders 3 in a more simplified way than FIG. 4. In this figure, the finishing process includes five steps. In (a) of FIG. 6 the movable jig-holders 3, 3 . . . 3 correspond to the movable jig-holders 3*a*, 3*b*, 3*c* . . . 3*q* of FIGS. 1 to 3, and the chuck units 4, 4 . . . 4 in the figure correspond to the chuck units 4*a*, 4*b*, 4*c* . . . 4*n*, 14*a* . . . 14*d* of FIGS. 1 to 3. Similarly, the guide rails 5, 5 in the figure correspond to the guide rails 5*a* and 5*b* of FIGS. 1 to 3, and the X-Y movable bed 6 corresponds to the X-Y movable bed 6 of FIGS. 1 to 3. The swing arms 7, 7 in the figure correspond to the swing arms 7*a* and 7*b* of FIGS. 1 to 3.

FIG. 6(*a*) shows a state immediately after the completion of the first and second operations. The swing arms 7, 7 are pivotally moved at 180 degrees to transfer the movable jig-holder 3 at the bottom and left position of the figure to the top and left position, and the movable jig-holder shown in FIG. 6(*a*) at the top and right position to the bottom and right position, so that the state of FIG. 6(*a*) is changed to the state of FIG. 6(*b*).

Next, the X-Y movable bed 6 is moved to the right as indicated by an arrow in FIG. 6(*b*) to permit the groove of the movable jig-holder 3 which is coupled with the chuck unit 4 of the left-side swing arm 7 to be fitted with the left end of the upper guide rail 5 in the figure, so that the state of FIG. 6(*b*) is changed to the state of FIG. 6(*c*). Other movable jig-holders 3, 3 on the upper guide rail 5 of the figure are also moved to the right by the same distance as the upper portion of the X-Y movable bed 6 moves.

Next, the upper portion of the X-Y movable bed 6 is moved in the direction indicated by an arrow in FIG. 6(*c*) to permit the upper movable jig-holders 3, 3, 3 of the figure to be separated from the chuck units 4, 4, 4 and the lower movable jig-holders 3, 3, 3 of the figure to be coupled with the chuck units 4, 4, 4 facing them, so that the state of FIG. 6(*c*) is changed to the state of FIG. 6(*d*). When the movable jig-holders are in the state of FIG. 6(*d*), the third, fourth and fifth operations are carried out.

Next, the upper portions of the X-Y movable bed 6 is moved in the direction indicated by an arrow of FIG. 6(*d*) to permit the lower movable jig-holders 3, 3, 3 of the figure to be moved to the left of the figure, so that the state of FIG. 6(*d*) is changed to the state of FIG. 6(*e*).

Next, the upper portion of the X-Y movable bed 6 is moved in the direction indicated by an arrow of FIG. 6(*e*) to permit the lower movable jig-holders 3, 3, 3 of the figure to be separated from the chuck units 4, 4, 4, and the upper movable holders 3, 3, 3 of the figure to be coupled to the chuck units 4, 4, 4, so that the state of FIG. 6(*e*) is changed to the state of FIG. 6(*f*).

Next, the upper portion of the X-Y movable bed 6 is moved in the direction indicated by an arrow of FIG. 6(*f*) to permit the upper movable jig-holders 3, 3, 3 of the figure to be moved to the right of the figure, so that the state of FIG. 6(*f*) is returned to the state of FIG. 6(*a*).

These operations are repeated. It is noted that the movable jig-holders 3 having slanting lines as in FIGS. 6(*a*) and 6(*d*) are in the positions ready to carry out the associated operations. The second and the subsequent operations are to be carried out for only the wound coil bobbin 1 which has been treated with the first and the previous operations. When the continuous operation is carried out, the cycle is performed beginning with the state shown in FIG. 6(*a*), through the states of FIGS. 6(*b*), 6(*c*), 6(*d*). 6(*e*) and 6(*f*) and returning to the state of FIG. 6(*a*) again, so that a wound coil bobbin when finished with this cycle is discharged from this system.

Referring back to FIG. 4 showing the present embodiment, the above cycle will be described in detail. A wound coil bobbin is supplied from the bobbin supplying machine 21 of a robot to this system and treated with taping by the taping machine 22. Next, the coil is changed in its axis direction at 90 degrees by the converter 23 as the coil is moved, so that the outwardly directed terminal pins of the coil are directed downwardly. Next, the coil is treated with a pretreatment for soldering by the flux dipping equipment 24. Next, the ends of the wound wire are bonded by soldering to the terminal pins of the coil bobbin by the soldering machine 25. Thereafter, continuity between the coil terminals is treated by the continuity tester 26. Next, the coil bobbin is changed in its axial direction again at 90 degrees by the converter 27 as the coil bobbin is moved, so that the upwardly-directed terminal pins of the coil bobbin which have been turned by 180 degrees by the swing arm are directed outwardly again. Next, defective coils are selected and discharged from the system by the discharge mechanism 28 in response to the result of the continuity test. Next, the remainder of the coils, i.e., non-defectives only, are discharged and fed out by the discharge mechanism 29.

A series of the finishing operations are thus carried out. When the taping is carried out by the taping machine 22, the coil bobbin must be rotated. Accordingly, the chuck unit **4*b* is rotated for this purpose. The chuck unit 4*b* is rotatably supported by the upper portion of the X-Y movable bed 6 by ball bearing means, not shown, and driven by a motor, not shown, included in the X-Y movable bed 6. Furthermore, a portion of the guide rail 5*b* facing the taping machine 22 is provided with a recess between 5*c*, 5*c* as shown in FIG. 1, so that the movable jig-holder 3 which has reached this portion of the guide rail 5*b* can rotate freely together with the chuck unit 4*b***.

A brief explanation on the structure of the bobbin posture converters 23 amd 27 will be given.

Figure 7B:
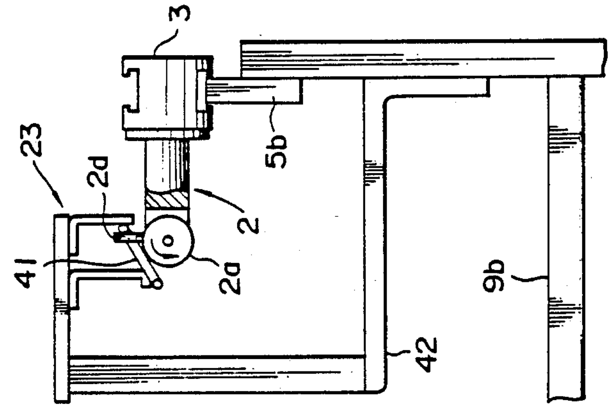
FIG. 7(*a*) is a front view and FIG. 7(*b*) is a right-hand side view showing one example of a converter for changing the direction of a coil axis.
Figure 7A:
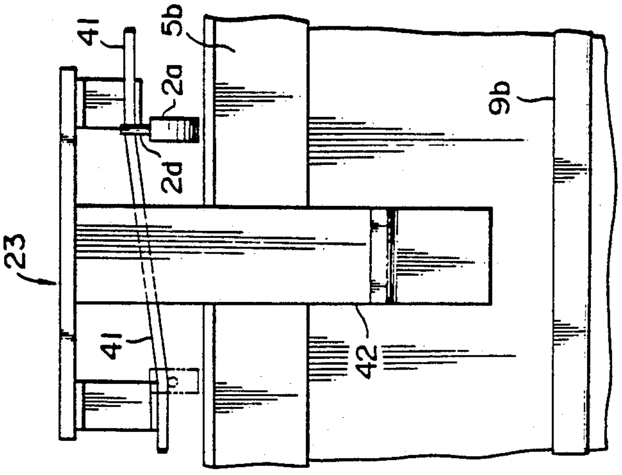

FIG. 7 shows one example of the converter 23 mounted on the guide rail **5*b*. FIG. 7**(*a*) is a front view as viewed from outside in relation to the X-Y movable bed 6, and FIG. 7(*b*) is a right-hand side view thereof.

Figure 8:
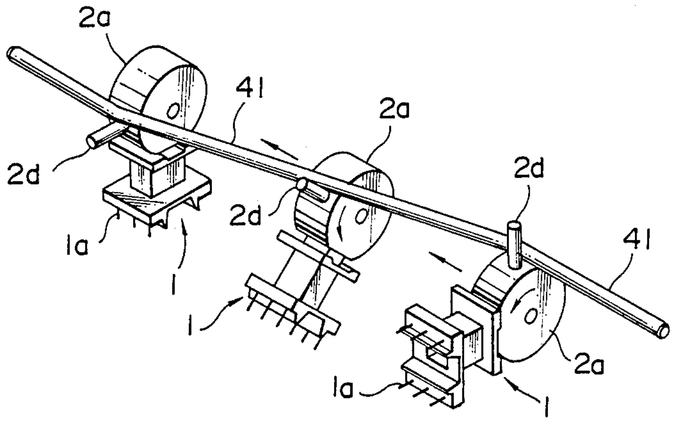
FIG. 8 is a perspective view explaining the changing of the direction of the coil axis by using the converter for chaanging the direction of a coil axis.
Figure 6A:
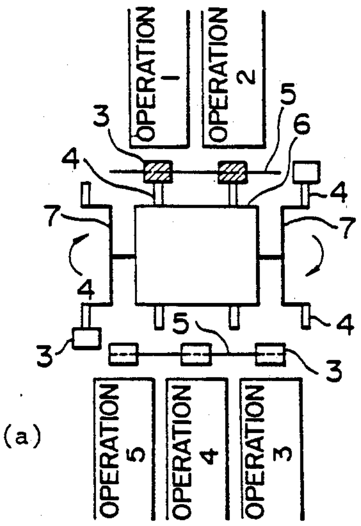
FIG. 6 is an explanatory view showing, in a simplified manner, different sequential states of the movable jig-holders.
Figure 6B:
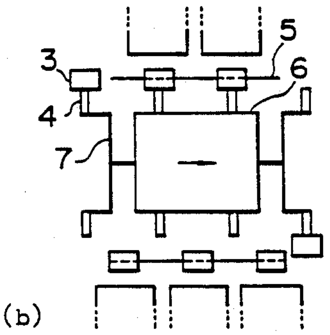
Figure 6C:
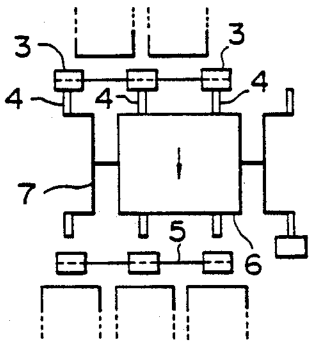
Figure 6D:
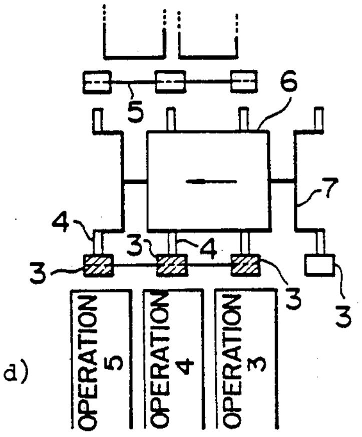
Figure 6E:
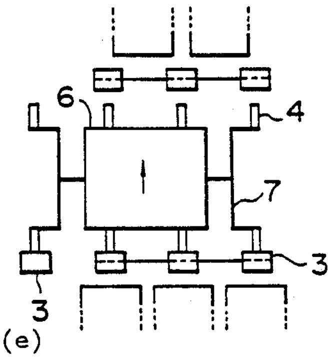
Figure 6F:
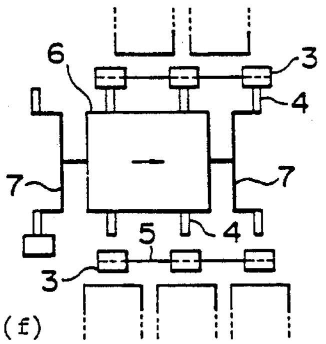

FIG. 8 is a perspective view showing the conversion of the direction of the axis of the coil bobbin by the converter 23.

As shown in FIGS. 7(*a*) and 7(*b*), a converting bar 41, which is the essential portion of the converter 23, is mounted on the side of the guide rail **5*b* through a bar mounting plate 42. The central long portion of the converting bar 41 is not in parallel to but is inclined with respect to the machine-mounting bed 9*b* and the guide rail 5*b*. The finishing jig 2 is coupled to the movable jig-holder 3, so that when the movable jig-holder 3 is moved on the guide rail 5*b* the finishing jig 2 is also moved. Thus, the head 2*a* of the finishing jig 2 is moved along the converting bar 41**.

Since the head **2*a* is rotatable and provided with the projection 2*d*, the projection 2*d* receives a pressure against the inclined portion of the converting bar 41 as the head 2*a* is moved horizontally to permit the head 2*a* to be rotated in the direction indicated by an arrow in FIG. 7**(*b*). Finally, the direction of the axis of the coil bobbin is changed at 90 degrees at the final point of the inclined portion of the converting bar 41. The detail of such changing of the direction of the axis of the coil is shown in FIG. 8.

It is noted that FIG. 8 shows three different states of the same coil bobbin for the sake of easy understanding. That is, the head **2*a* of the finishing jig 2 moving along the converting bar 41 and the coil bobbin 1 mounted on this head 2*a* are shown with the three different states; that is, at the initial, the intermediate, and the final stages of the inclined portion of the converting bar 41**.

As shown at the bottom an right of FIG. 8, the coil terminal pins **1*a* of the coil bobbin 1 which are initially directed horizontally are gradually directed downward while the head 2*a* is moved along the inclined portion of the converting bar 41, so that the coil terminal pins 1*a* are finally directed downward. The direction of the axis of the coil bobbin is thus changed from the horizontal, outward-directed state to the downward-directed state at 90 degrees using the converter 23. The other converter 27 has a different inclined portion having an inclinational direction which is different from that of the converter 23. The direction of the axis of the coil bobbin is changed by the converter 27 from the upwardly directed state to the horizontal, outward-directed state based on the same principle as the converter 23**.

Other finishing apparatuses such as the taping machine 22, the soldering machine 25 and the continuity tester 26, are well known in their structure and therefore any particular explanation on them is not made here.

However, it should be noted that the action of the respective finishing apparatuses and the action of the upper portion of the X-Y movable bed 6 and the swing arms **7*a* and 7*b* is all controlled by an electronic controller, not shown, including therein a computer. Although the upper portion of the X-Y movable bed 6 is driven by DC servo-motors in the embodiment shown in FIGS. 1 to 3, air cylinders may be used in place of such DC servo-motors. Further, the continuity tester of FIG. 4** may be replaced with a resistance tester.

The above-mentioned system according to the present invention has the following advantages.

Several finishing apparatuses may be arranged within a limited space around the circulating coil bobbins. The space for this system becomes much smaller than in the conventional system. Even when the soldering step is arranged as far as possible from the operator, the overall space for the system remains relatively small. The coil bobbin supply point and the coil bobbin discharge point for this system can be set closely to each other. Furthermore, the product quality may be improved and the working time may be shortened.

What is claimed is:

1. An automatic finishing system for a wound coil in a coil winding machine comprising:

a wound coil moving means for moving a wound coil intermittently along a circulating endless path, said wound coil moving means including an X-Y movable bed having first and second opposite sides, third and fourth opposite sides, a lower portion fixed to a central portion of a base and an upper portion movable back and forth along each of two directions with respect to said loawer portion;

guide rails provided on said base at said first and second sides of said X-Y movable bed each facing the sides of said X-Y movable bed;

swing arms having first and second ends mounted respectively on said third and fourth sides of said X-Y movable bed not facing said guide rails so that their end positions can be reversed by rotation through an angle of approximately 180 degrees;

a plurality of chuck units mounted on one side of the upper portion of said X-Y movable bed facing one of said guide rails and at each of said first and second ends of said swing arms;

a plurality of finishing jigs for holding the wound coil for the respective finishing steps, and a plurality of movable jig-holders adapted to be held by said chuck units for moving along said guide rails and holding said finishing jigs;

finishing apparatuses for respective finishing steps disposed in order around said endless path; and a controller for synchronously controlling at least said wound coil moving means and said finishing apparatuses for the respective finishing steps whereby finishing operations are carried out continuously and automatically when the wound coil reaches the respective finishing apparatuses.

2. An automatic finishing system for a wound coil in a coil winding machine according to claim 1, wherein said X-Y movable bed further comprises a means for rotating one of said swing arms carrying a wound coil to rotate the wound coil therewith.

3. An automatic finishing system for a wound coil in a coil winding machine comprising:

a wound coil moving means for moving a wound coil intermittently along a circulating endless path, said wound coil moving means for moving the coil including an X-Y movable bed having first and second opposite sides, third and fourth opposite sides, a lower portion fixed to a base and an upper portion movable back and forth along each of two directions with respect to said lower portion;

guide rails disposed on said base at said first and second sides of said X-Y movable bed each facing a respective one of said two sides of said X-Y movable bed;

swing arms each having first and second ends rotatably mounted respectively on said third and fourth sides of said X-Y movable bed such that their positions can be changed by rotation through an angle corresponding to positions related to the positions of said guide rails, a plurality of chuck units mounted on one side of said upper portion of said X-Y movable bed facing one of said guide rails and on at least one of said first and second ends;

a plurality of finishing jigs for holding the wound coils, and a plurality of movable jig-holders adapted to be respectively held by said chuck units for moving along said guide rails and holding said finishing jigs;

finishing apparatuses for respective finishing steps disposed around said endless path; and a controller for synchronously controlling at least said wound coil moving means and said finishing apparatuses for the respective finishing steps; whereby finishing operations are carried out when the wound coil reaches the respective finishing appartuses.

* * * * *